US012620631B2

(12) United States Patent
Kondou et al.

(10) Patent No.: US 12,620,631 B2
(45) Date of Patent: May 5, 2026

(54) METHOD FOR MANUFACTURING BATTERY, AND BATTERY

(71) Applicants: Panasonic Holdings Corporation, Osaka (JP); TOYOTA JIDOSHA KABUSHIKI KAISHA, Aichi-ken (JP)

(72) Inventors: Shigeru Kondou, Osaka (JP); Kazutaka Nishikawa, Nara (JP); Hiroshi Yamashita, Hyogo (JP); Noriaki Yamamoto, Toyota (JP)

(73) Assignees: Panasonic Holdings Corporation, Osaka (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 791 days.

(21) Appl. No.: 17/911,377

(22) PCT Filed: Mar. 10, 2021

(86) PCT No.: PCT/JP2021/009538
§ 371 (c)(1),
(2) Date: Sep. 13, 2022

(87) PCT Pub. No.: WO2021/182513
PCT Pub. Date: Sep. 16, 2021

(65) Prior Publication Data
US 2023/0095738 A1 Mar. 30, 2023

(30) Foreign Application Priority Data
Mar. 13, 2020 (JP) ................................. 2020-043759

(51) Int. Cl.
*H01M 10/0585* (2010.01)
*H01M 10/0525* (2010.01)
*H01M 50/609* (2021.01)

(52) U.S. Cl.
CPC ... *H01M 10/0585* (2013.01); *H01M 10/0525* (2013.01); *H01M 50/609* (2021.01)

(58) Field of Classification Search
CPC ......... H01M 10/0585; H01M 10/0525; H01M 50/609
See application file for complete search history.

(56) References Cited

U.S. PATENT DOCUMENTS 7,404,829 B1 * 7/2008 Feger ....................... H01G 9/02
29/25.03
9,748,547 B2 8/2017 Murase et al.
(Continued)

FOREIGN PATENT DOCUMENTS

| JP | 2004-071358 A | 3/2004 | |
|----|---------------|--------|----------|
| JP | 2004185920 A * | 7/2004 | ............ H01M 50/42 |

(Continued)

OTHER PUBLICATIONS

Machine Translation of JP-2017050215-A (Jul. 18, 2025) (Year: 2025).*

(Continued)

*Primary Examiner* — Matthew J Merkling
(74) *Attorney, Agent, or Firm* — Rimon P.C.

(57) ABSTRACT

A method for manufacturing a battery includes: accommodating a stacked electrode body, in which a separator that has an adhesive layer and an electrode plate are stacked and the electrode plate is bonded to the separator via the adhesive layer, in a case; injecting an electrolytic solution into the case; and reducing the adhesive strength between the electrode plate and the separator at the same time, or around the same time, as the injection of the electrolytic solution.

2 Claims, 6 Drawing Sheets

(56) References Cited

U.S. PATENT DOCUMENTS

| | | | | | |
|---|---|---|---|---|---|
| 2002/0055044 A1* | 5/2002 | Jan | ..................... | H01M 10/0565 | |
| | | | | 429/314 | |
| 2004/0101757 A1* | 5/2004 | Kii | ........................ | H01M 50/46 | |
| | | | | 429/253 | |
| 2015/0311490 A1* | 10/2015 | Murase | ............ | H01M 10/0525 | |
| | | | | 524/521 | |
| 2016/0036034 A1* | 2/2016 | Lee | ..................... | H01M 10/657 | |
| | | | | 219/635 | |
| 2022/0263087 A1* | 8/2022 | Ryu | .................. | H01M 10/0468 | |

FOREIGN PATENT DOCUMENTS

| | | |
|---|---|---|
| JP | 2014-120456 A | 6/2014 |
| JP | 2017-050215 A | 3/2017 |
| JP | 2018113122 A * | 7/2018 |
| JP | 2019-053862 A | 4/2019 |
| JP | 2019-125441 A | 7/2019 |
| WO | 2014/081035 A1 | 5/2014 |

OTHER PUBLICATIONS

Machine Translation of JP-2018113122-A (Jul. 18, 2025) (Year: 2025).*
Machine Translation of JP-2004185920-A (Jul. 18, 2025) (Year: 2025).*
Machine Translation of JP 2004071358 A (Jul. 18, 2025) (Year: 2025).*
International Search Report issued in corresponding International Application No. PCT/JP2021/009538, dated Jun. 1, 2021, with English translation.

* cited by examiner 4,12
2
4,10
2
4,12
2
4,10

14

1

8

6

8

2

METHOD FOR MANUFACTURING BATTERY, AND BATTERY

CROSS-REFERENCE TO RELATED APPLICATIONS

This application is the U.S. National Phase under 35 U.S.C. § 371 of International Patent Application No. PCT/JP2021/009538, filed on Mar. 10, 2021, which in turn claims the benefit of Japanese Patent Application No. 2020-043759, filed on Mar. 13, 2020, the entire content of each of which is incorporated herein by reference.

BACKGROUND

Field of the Invention

The present disclosure relates to a method for manufacturing batteries and batteries.

Description of the Related Art

In recent years, shipments of in-vehicle secondary batteries have been increasing with the spread of electric vehicles (EV), hybrid vehicles (HV), plug-in hybrid vehicles (PHV), and the like. In particular, shipments of lithium-ion secondary batteries are increasing. Further, secondary batteries are becoming widespread not only for in-vehicle use but also as a power source for portable terminals such as laptop computers. Regarding such secondary batteries, for example, Patent Literature 1 discloses producing a stacked electrode body by stacking and thermo-compressing a separator having an adhesive layer and an electrode, and after the stacked electrode body is housed in a case, injecting an electrolytic solution into the case so as to produce a secondary battery.

Patent Literature 1: PCT International Publication No. WO 2014/081035

In a secondary battery, an electrode reaction occurs in a state where an electrolytic solution is in contact with an electrode plate. Therefore, when producing a secondary battery, it is necessary to impregnate a stacked electrode body with an electrolytic solution. On the other hand, in order to increase the energy density of a secondary battery, the volume occupied by a stacked electrode body inside a case tends to increase. Therefore, the time required for impregnating a stacked electrode body with an electrolytic solution is increasing. The longer the impregnation time, the longer the production lead time of the secondary battery can be. Further, production facilities may be forced to increase in order to prevent a decrease in the throughput of secondary battery production.

SUMMARY OF THE INVENTION

In this background, a purpose of the present disclosure is to provide a technique for shortening the impregnation time of a stacked electrode body with an electrolytic solution.

One embodiment of the present disclosure relates to a method for manufacturing a battery. This method for manufacturing a battery includes: accommodating a stacked electrode body, in which a separator that has an adhesive layer and an electrode plate are stacked and the electrode plate is bonded to the separator via the adhesive layer, in a case; injecting an electrolytic solution into the case; and reducing the adhesive strength between the electrode plate and the separator at the same time, or around the same time, as the injection.

Another embodiment of the present disclosure relates to a battery. This battery includes a stacked electrode body in which a separator having an adhesive layer and an electrode plate are stacked, an electrolytic solution impregnating the stacked electrode body, and a case that accommodates the stacked electrode body and the electrolytic solution. The electrode plate is arranged to face the adhesive layer and has a non-bonded area that is not bonded with the adhesive layer in at least a part of a surface thereof that is facing the adhesive layer.

Optional combinations of the aforementioned constituting elements, and implementations of the present disclosure in the form of methods, apparatuses, and systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1A:
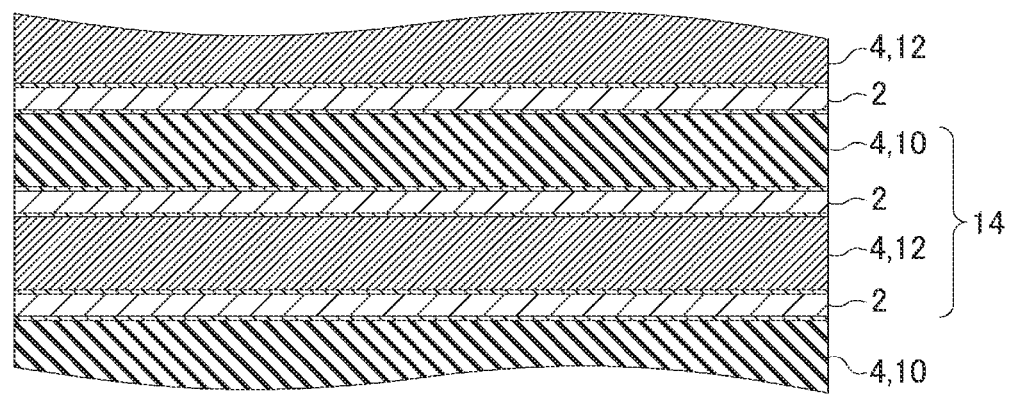
FIG. 1A is a cross-sectional view schematically showing a part of a stacked electrode body used in a method for manufacturing a battery according to the first embodiment.

Hereinafter, the present disclosure will be described based on a preferred embodiment with reference to the figures. The embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

First Embodiment

FIG. 1A is a cross-sectional view schematically showing a part of a stacked electrode body used in a method for

Figure 1B:
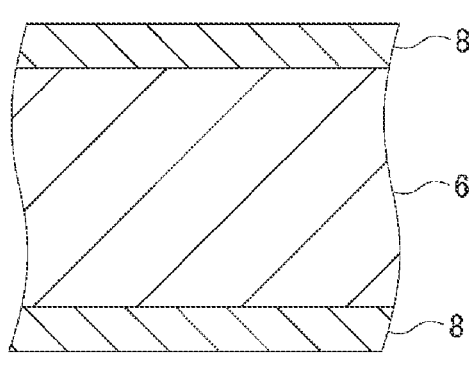
FIG. 1B is a cross-sectional view schematically showing a part of a separator.

3 manufacturing a battery according to the first embodiment. FIG. 1B is a cross-sectional view schematically showing a part of a separator. FIG. 1A illustrates a stacked electrode body 1 in a state before an adhesive strength reduction process described later is applied. The stacked electrode body 1 has a structure in which a separator 2 and an electrode plate 4 are stacked.

The separator 2 has a base material 6 and an adhesive layer 8. The base material 6 is, for example, a sheet composed of a microporous membrane made of polyolefin such as polyethylene and polypropylene. The base material 6 may have a monolayer or multilayer structure. The base material 6 preferably has an insulating property.

The adhesive layer 8 is provided on at least one main surface of the base material 6. In the present embodiment, the adhesive layer 8 is provided on each side of the base material 6. The adhesive layer 8 is obtained by applying an adhesive to the surface of the base material 6 using a known coating device. The adhesive layer 8 according to the present embodiment has an adhesive property where the adhesive strength decreases upon heating. Examples of the adhesive constituting such an adhesive layer 8 are thermoplastic heat-sensitive adhesives in which the adhesive strength decreases at a temperature higher than a set temperature preferably with substantial loss of adhesive strength. The adhesive layer 8 exhibits the adhesive strength necessary for the electrode plate 4 to remain connected to the separator 2 at room temperature (e.g., 20-25 degrees Celsius). The expression "adhesive strength decreases" means that the adhesive strength at a certain temperature after heating is preferably less than 30 percent of the adhesive strength at room temperature, more preferably less than 20 percent, and even more preferably less than 10 percent. The adhesive strength is, for example, 180-degree peel strength (N/25 mm) measured by a method specified in the Japanese Industrial Standard JIS C2107 (1999).

The composition of a thermosensitive adhesive is not particularly limited as long as the adhesive strength decreases when heated to a temperature higher than the set temperature. Typically, an acrylic adhesive, which is a resin composition containing acrylic resin as the main component, can be used. When acrylic resin is included as a component in the thermosensitive adhesive, the decrease in the adhesive strength of the adhesive layer 8 is due to the acrylic resin melting upon heating and then losing adhesive strength. Therefore, heating the thermosensitive adhesive to a temperature equal to or above the glass transition point thereof can rapidly reduce the adhesive strength of the thermosensitive adhesive.

The temperature at which the adhesive strength of the adhesive layer 8 decreases is set within a temperature range of, for example, 40 to 120 degrees Celsius, preferably 50 to 100 degrees Celsius. Setting the temperature at which the adhesive strength decreases to 40 degrees Celsius or higher can prevent a situation where the adhesive strength of the adhesive layer 8 decreases before the stacked electrode body 1 is housed in a case 32 causing the electrode plate 4 and separator 2 to be separated. Further, setting the temperature at which the adhesive strength decreases to 120 degrees Celsius or lower can prevent the stacked electrode body 1 from getting heated to or above a shutdown temperature of a microporous membrane that constitutes the base material 6 in a process of reducing the adhesive strength between the electrode plate 4 and the separator 2 described later. Shutdown means that when the temperature inside a battery rises excessively, the pores are sealed and the flow of lithium ions between electrodes is stopped.

The electrode plate 4 includes a positive electrode plate 10 and a negative electrode plate 12. The positive electrode plate 10 has a structure in which a positive electrode active material layer is stacked on one or both sides of a positive electrode current collector. The positive electrode current collector is composed of, for example, metal foil such as aluminum foil, expanded material, lath material, and the like. The positive electrode active material layer can be formed by applying a positive electrode mixture on the surface of the positive electrode current collector using a known coating device, followed by drying and rolling. The positive electrode mixture is obtained by kneading and mixing materials such as positive electrode active material, binding material, and conductive material into a dispersant and dispersing the materials uniformly.

If the stacked electrode body 1 is used in a lithium-ion secondary battery, the positive electrode active material is not particularly limited as long as a material that can reversibly absorb and release lithium ions is used. Typically, a lithium-containing transition metal compound can be used as the positive electrode active material. Examples of the lithium-containing transition metal compound include composite oxides containing at least one element selected from the group consisting of cobalt, manganese, nickel, chromium, iron, and vanadium, and lithium.

The binding material is not particularly limited as long as the binding material can be kneaded and dispersed in a dispersant. For example, as the binding material, a fluororesin such as polyvinylidene fluoride or polytetrafluoroethylene, acrylic rubber, acrylic resin, vinyl resin or the like can be used. As the conductive material, a carbon material such as acetylene black, graphite, carbon fiber, etc., can be used. As the dispersant, a solvent capable of dissolving the binding material is used. The positive electrode mixture may contain a dispersant, a surfactant, a stabilizer, a thickener, etc., as needed.

The negative electrode plate 12 has a structure in which a negative electrode active material layer is stacked on one or both sides of a negative electrode current collector. The negative electrode current collector is composed of, for example, metal foil made of copper, copper alloy, or the like, expanded material, lath material, and the like. The negative electrode active material layer can be formed by applying a negative electrode mixture on the surface of the negative electrode current collector using a known coating device, followed by drying and rolling. The negative electrode mixture is obtained by kneading and mixing materials such as negative electrode active material, binding material, and conductive material into a dispersant and dispersing the materials uniformly. The negative electrode plate 12 can also be made by dry methods such as vapor deposition and sputtering instead of the wet method described above.

If the stacked electrode body 1 is used in a lithium-ion secondary battery, the negative electrode active material is not particularly limited as long as a material that can reversibly absorb and release lithium ions is used. Typically, a carbon material containing graphite with a graphite-type crystal structure can be used as the negative electrode active material. Examples of the carbon material include natural graphite, spherical or fibrous artificial graphite, hard carbon, soft carbon, and the like. As the negative electrode active material, lithium titanate, silicon, tin, and the like can also be used. The same as those used for the positive electrode active material apply to the binding material and the conductive material. The negative electrode mixture may contain a dispersant, a surfactant, a stabilizer, a thickener, etc., as needed.

Each electrode plate 4 is bonded to the separator 2 via the adhesive layer 8 in a condition obtained before the adhesive strength reduction process is applied. This allows a stacked electrode body 1 to be obtained in which the separator 2 and electrode plate 4 are connected to each other. The stacked electrode body 1 according to the present embodiment has a structure in which a plurality of unit stacked bodies 14 are stacked. The number of stackings of a unit stacked body 14 in the stacked electrode body 1 is, for example, 30 to 40. The unit stacked body 14 has a structure in which a positive electrode plate 10, a separator 2, a negative electrode plate 12, and a separator 2 are stacked in this order.

The stacked electrode body 1 according to the present embodiment is of a stacked type in which a plurality of single plates of a separator 2 and single plates of an electrode plate 4 are stacked. However, the structure is not particularly limited to this structure. The stacked electrode body 1 needs to have, at least in part, a stacked structure of a separator 2 and an electrode plate 4 bonded to each other and may be of a wound type in which a strip-shaped separator 2 and a strip-shaped electrode plate 4 are wound around each other or a zigzag type in which a single electrode plate 4 is arranged in each groove of a strip-shaped separator 2 folded in a zigzag manner.

Next, the method for manufacturing a battery according to the present embodiment will be explained. FIGS. 2A to 2B, FIGS. 3A to 3B, FIGS. 4A to 4B, and FIGS. 5A to 5B are schematic diagrams for explaining the method for manufacturing a battery according to the first embodiment.

<Preparation of Stacked Electrode Body 1>

Figure 2A:
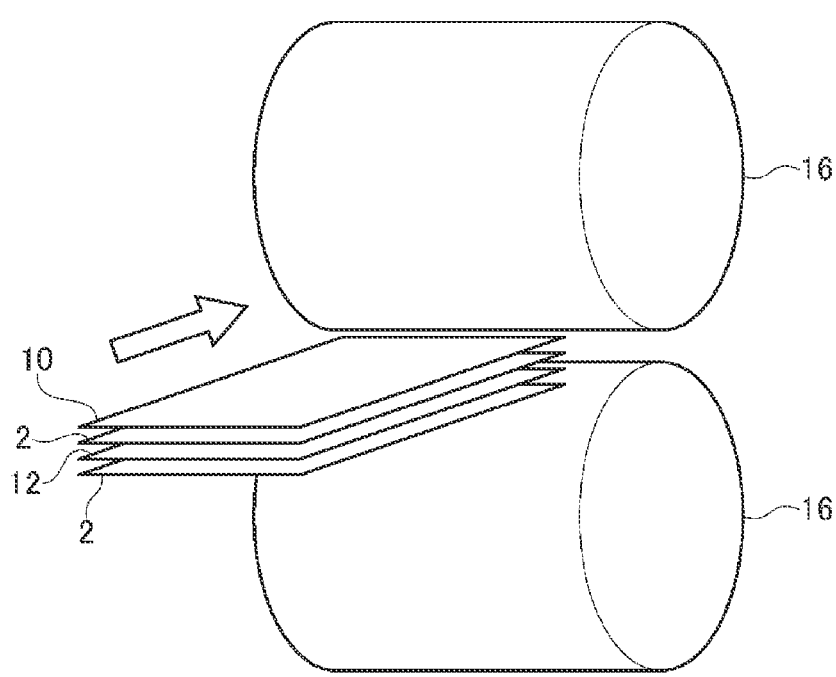
FIGS. 2A-2B are schematic diagrams for explaining the method for manufacturing a battery according to the first embodiment.
Figure 2B:
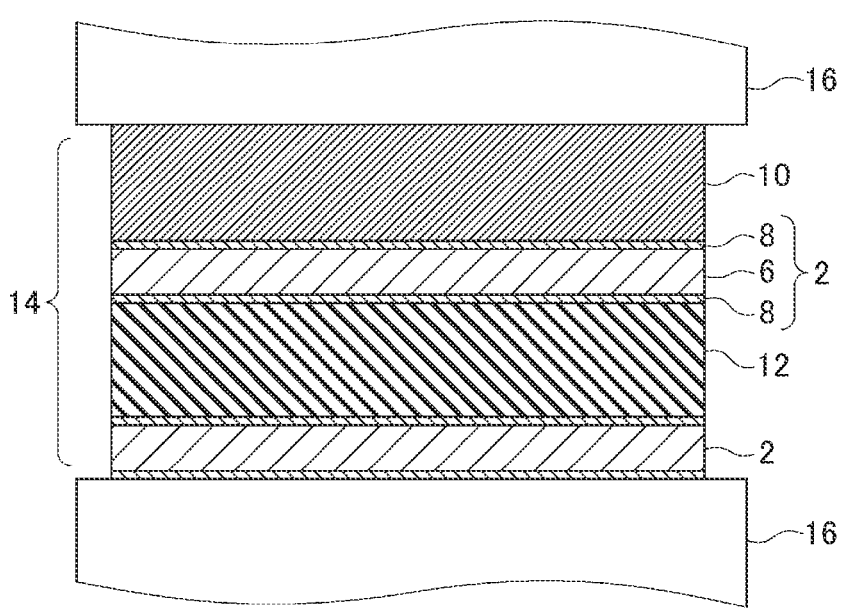
Figure 3A:
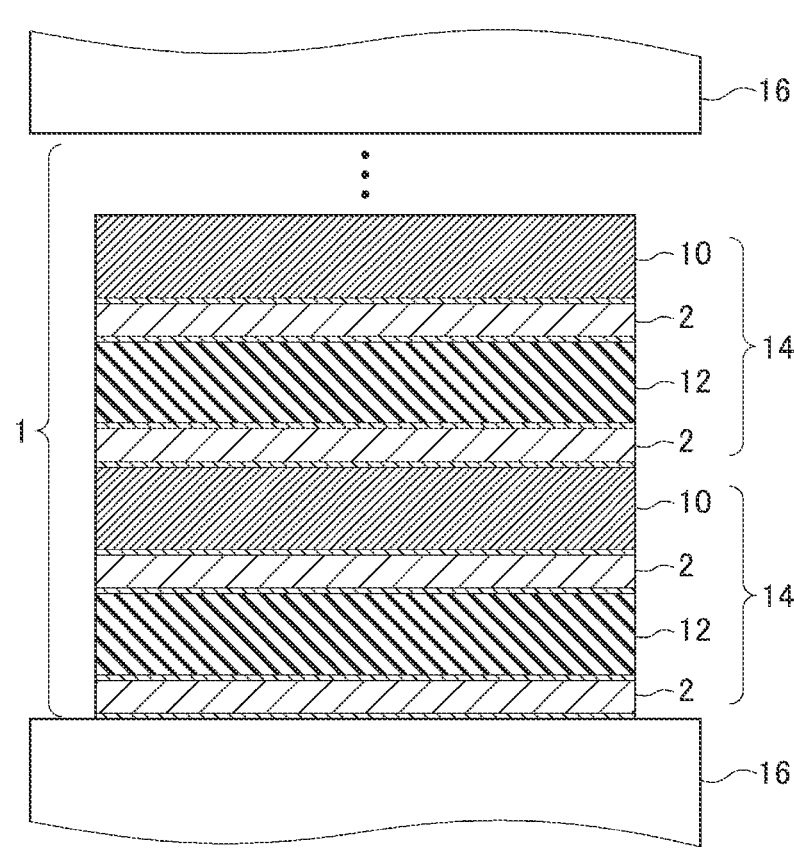
FIGS. 3A-3B are schematic diagrams for explaining the method for manufacturing a battery according to the first embodiment.

As shown in FIGS. 2A and 2B, a positive electrode plate 10, a separator 2, a negative electrode plate 12, and a separator 2 are passed between a pair of thermo-compression rollers 16. This causes the positive electrode plate 10, the separator 2, the negative electrode plate 12, and the separator 2 to be thermo-compressed, and a unit stacked body 14 is thus obtained. Then, as shown in FIG. 3A, a plurality of unit stacked bodies 14 are thermo-compressed using a pair of thermo-compression rollers 16. This allows a stacked electrode body 1 to be obtained.

<Assembly of Battery 36>

Figure 3B:
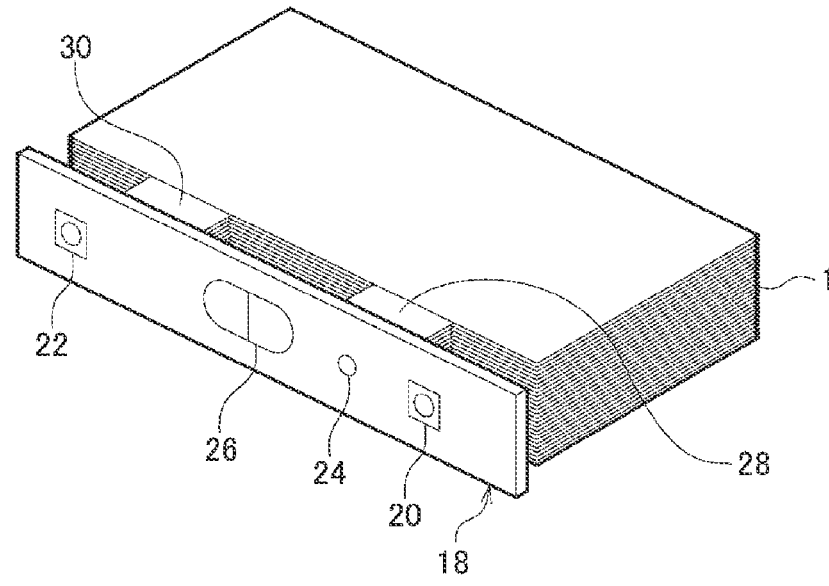

As shown in FIG. 3B, a sealing plate 18 is prepared. The sealing plate 18 is made of a metal such as aluminum, iron, or stainless steel. The sealing plate 18 has a positive electrode terminal 20, a negative electrode terminal 22, a liquid injection hole 24, and a safety valve 26. The liquid injection hole 24 is used for injecting an electrolytic solution into the case. The safety valve 26 opens when the internal pressure of the case rises to a predetermined value or above so as to release gas inside the case.

The positive electrode current collector of the stacked electrode body 1 is electrically connected to the positive electrode terminal 20 via a positive electrode current collector tab 28 for power extraction. The negative electrode current collector of the stacked electrode body 1 is electrically connected to the negative electrode terminal 22 via a negative electrode current collector tab 30 for power extraction. The positive electrode current collector and the positive electrode current collector tab 28 may form an integrally molded body or may be separate bodies joined by welding or the like. In the same way, the negative electrode current collector and the negative electrode current collector tab 30 may form an integrally molded body or may be separate bodies joined by welding or the like. The positive electrode current collector tab 28 and the positive electrode terminal 20 are joined by welding or the like, and the negative electrode current collector tab 30 and the negative electrode terminal 22 are joined by welding or the like.

Figure 4A:
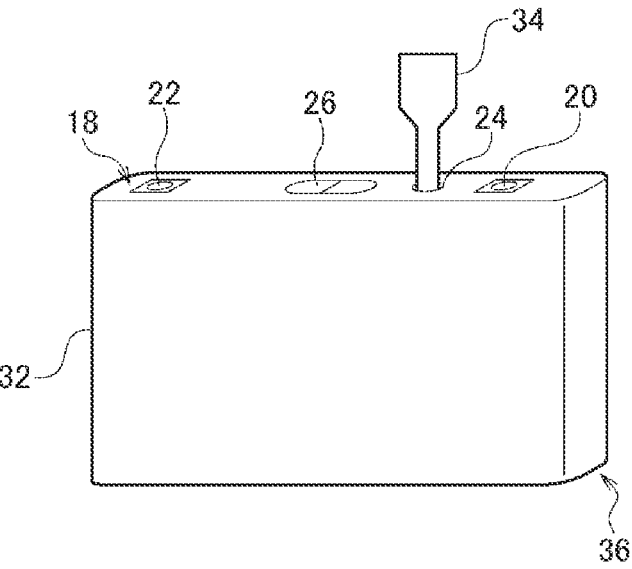
FIGS. 4A-4B are schematic diagrams for explaining the method for manufacturing a battery according to the first embodiment.

Then, as shown in FIG. 4A, the stacked electrode body 1 welded to the sealing plate 18 is housed in a case 32. The case 32 is made of the same material as the sealing plate 18. The case 32 has a flat rectangular shape. Alternatively, the case 32 may be cylindrical or the like. The case 32 has an opening, through which the stacked electrode body 1 is inserted into the inside of the case 32. Since a plurality of separators 2 and a plurality of electrode plates 4 are connected to each other via an adhesive layer 8, the stacked electrode body 1 can be easily inserted into the case 32. After inserting the stacked electrode body 1 into the case 32, the opening of the case 32 is sealed with the sealing plate 18, and the case 32 and the sealing plate 18 are joined by welding or the like. The sealing plate 18 constitutes a part of the case 32.

Then, an electrolytic solution 34 is injected into the case 32 through the liquid injection hole 24. The electrolytic solution 34 includes, for example, a non-aqueous solvent and an electrolyte dissolved in the non-aqueous solvent. As the non-aqueous solvent, a known solvent such as ethylene carbonate, propylene carbonate, 1,2-dimethoxyethane, and 1,2-dichloroethane can be used. As the electrolyte, a known electrolyte such as lithium salts with strong electron-withdrawing properties, specifically, $LiPF_6$, $LiBF_4$, or the like can be used. After the electrolytic solution 34 is injected into the case 32, a liquid injection plug (not shown) is joined to the liquid injection hole 24 by welding or the like. This allows the battery 36 to be assembled.

<Adhesive Strength Reduction Process>

Figure 4B:
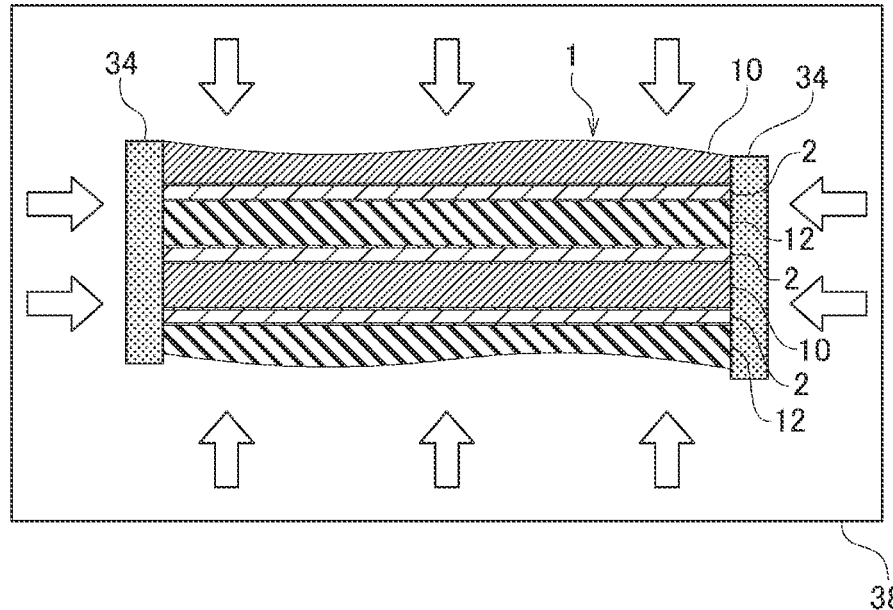
Figure 5A:
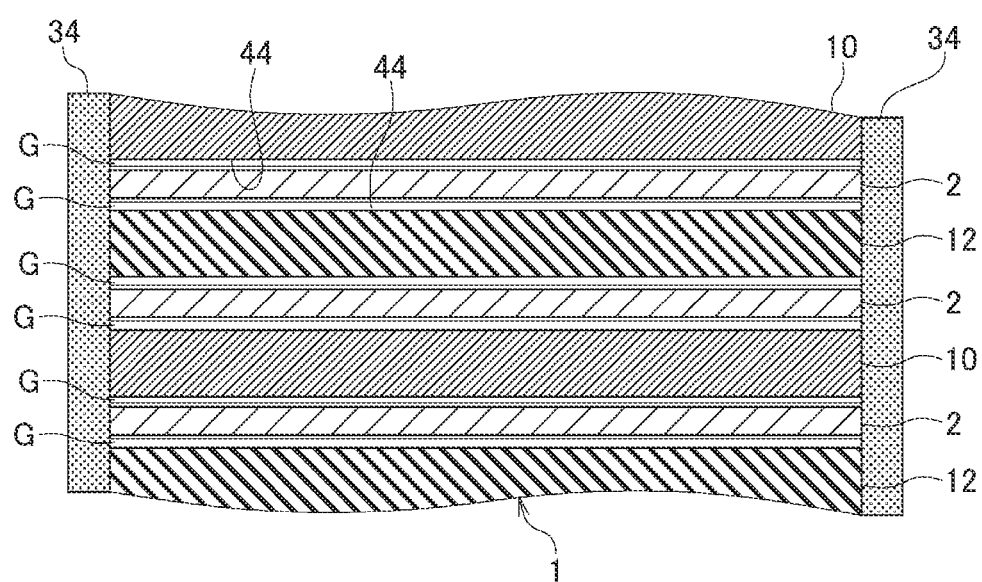
FIGS. 5A-5B are schematic diagrams for explaining the method for manufacturing a battery according to the first embodiment.
Figure 5B:
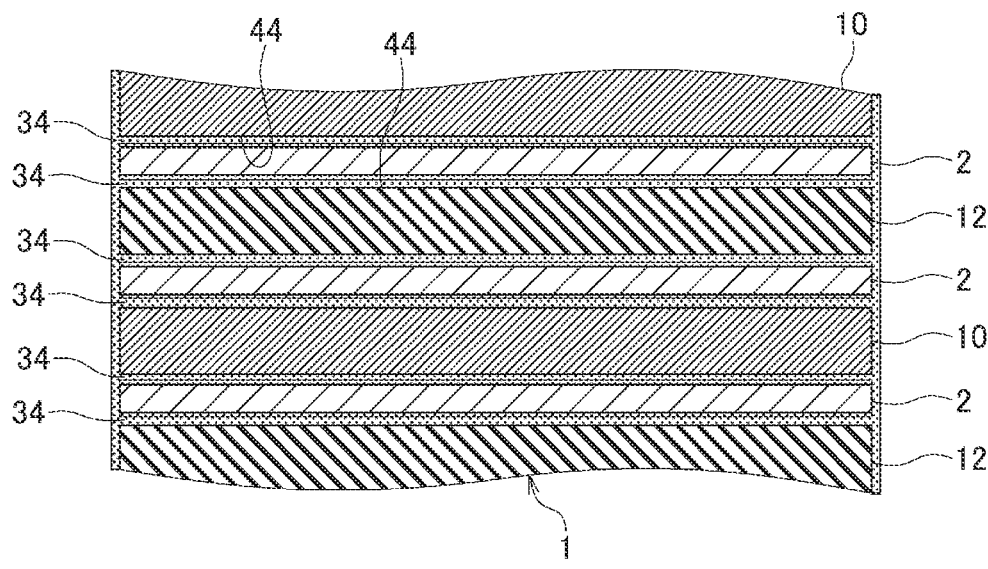

As shown in FIG. 4B, the adhesive layer 8 is heated so as to reduce the adhesive strength between the electrode plate 4 and separator 2. For example, by heating the battery 36 with a known heater 38, the temperature of the adhesive that constitutes the adhesive layer 8 is raised to the glass transition point thereof or higher so as to reduce the adhesive strength of the adhesive layer 8. This allows the adhesive strength between the electrode plate 4 and the separator 2 to be reduced. This decrease in the adhesive strength causes the electrode plate 4 and separator 2 to peel off, and a gap G is created between the two, as shown in FIG. 5A. Therefore, on the respective surfaces of the positive electrode plate 10 and the negative electrode plate 12 that face the adhesive layer 8, a non-bonded area 44 that is not bonded with the adhesive layer 8 is formed. As a result, as shown in FIG. 5B, the electrolytic solution 34 enters the gap G, and the air existing in the gap G is expelled to the outside, and the electrolytic solution 34 and air are smoothly replaced with each other. This allows the electrolytic solution 34 to impregnates the electrode plate 4 quickly. Further, heating reduces the viscosity of the electrolytic solution 34. This can also promote the impregnation of the stacked electrode body 1 with the electrolytic solution 34.

The above process allows a battery 36 in which the stacked electrode body 1 is impregnated with the electrolytic solution 34 to be obtained. This battery 36 includes a stacked electrode body 1 in which a separator 2 having an adhesive layer 8 and an electrode plate 4 are stacked, an electrolytic solution 34 impregnating the stacked electrode body 1, and a case 32 that accommodates the stacked electrode body 1 and the electrolytic solution 34. In the stacked electrode body 1, the electrode plate 4 is arranged to face the adhesive layer 8 and has a non-bonded area 44 not bonded with the adhesive layer 8 in at least a part of a surface thereof that is facing the adhesive layer 8. The non-bonded area 44 is an area where the adhesive strength between the separator 2 and the electrode plate 4 in the area is less than 30 percent of the adhesive strength obtained before the adhesive strength reduction process is performed, more preferably less than 20 percent, and even more preferably less than 10 percent.

The decrease in the adhesive strength between the electrode plate 4 and the separator 2, the generation of a gap G between the electrode plate 4 and the separator 2, and the entry of the electrolytic solution 34 into the gap G are illustrated step by step in FIGS. 4B to 5B. However, these phenomena can occur concurrently. In other words, when the adhesive strength between the electrode plate 4 and the separator 2 begins to decrease due to heating, the peeling off of the electrode plate 4 and separator 2 and the entry of the electrolytic solution 34 into the gap G can proceed concurrently, and the impregnation of the stacked electrode body 1 with the electrolytic solution 34 can proceed.

As explained above, the method for manufacturing a battery 36 according to the present embodiment includes: accommodating a stacked electrode body 1, in which a separator 2 that has an adhesive layer 8 and an electrode plate 4 are stacked and the electrode plate 4 is bonded to the separator 2 via the adhesive layer 8, in a case 32; injecting an electrolytic solution 34 into the case 32; and reducing the adhesive strength between the electrode plate 4 and the separator 2 after the injection of the electrolytic solution 34. Decreasing the adhesive strength between the electrode plate 4 and the separator 2 allows the electrolytic solution 34 to more easily enter between the electrode plate 4 and the separator 2. This can shorten the impregnation time of the stacked electrode body 1 with the electrolytic solution 34.

Further, the adhesive layer 8 according to the present embodiment has an adhesive property where the adhesive strength decreases upon heating. The method for manufacturing the battery 36 according to the present embodiment heats the adhesive layer 8 so as to decrease the adhesive strength between the electrode plate 4 and the separator 2. This can easily shorten the impregnation time of the stacked electrode body 1 with the electrolytic solution 34.

The shortened impregnation time can reduce the production lead time of a battery 36. Further, an increase in production facilities to maintain the throughput of batteries 36 can be avoided, and thus an increase in production space can also be avoided. In addition, it is possible to increase the capacity of a battery 36 while suppressing the extension of the production lead time.

In the battery 36, the electrolytic solution 34 can be discharged from the stacked electrode body 1 by the expansion of the active material during charging. The electrolytic solution 34 returns to the stacked electrode body 1 by the contraction of the active material during discharging. If the electrolytic solution 34 does not fully return to the stacked electrode body 1, an area of the electrode plate 4, a part of which is not impregnated with the electrolytic solution 34, i.e., an area that does not contribute to discharging, can be created. In contrast, if the adhesive strength between the electrode plate 4 and separator 2 is reduced, the electrolytic solution 34 discharged from the stacked electrode body 1 during charging can smoothly return to the stacked electrode body 1 during discharging. Therefore, according to the present embodiment, the charge-discharge characteristics of the battery 36 can be improved, and the cycle life can thus be improved.

Second Embodiment

The present embodiment shares a common structure with the first embodiment, except for the adhesive strength reduction process. Hereinafter, an explanation will be given mainly on structures different from those of the first embodiment, and the common structure will be briefly described or omitted.

In the first embodiment, the adhesive layer 8 is heated after the electrolytic solution 34 is injected into the case 32. However, in the present embodiment, the electrolytic solution 34 is injected after the adhesive layer 8 is heated. In other words, the adhesive layer 8 is heated before the electrolytic solution 34 is injected into the case 32. In this case, the flow pressure of the electrolytic solution 34 when the electrolytic solution 34 is injected into the case 32 allows the electrode plate 4 and separator 2 to be peeled off. This can further shorten the impregnation time of the stacked electrode body 1 with the electrolytic solution 34.

Third Embodiment

The present embodiment shares a common structure with the first embodiment, except for the adhesive strength reduction process. Hereinafter, an explanation will be given mainly on structures different from those of the first embodiment, and the common structure will be briefly described or omitted.

In the present embodiment, the heated electrolytic solution 34 is injected into the case 32 so as to heat the adhesive layer 8 by the heat of the electrolytic solution 34. In other words, in the present embodiment, the adhesive layer 8 is heated at the same time as the electrolytic solution 34 is injected into the case 32. This can simplify the manufacturing process of the battery 36 compared to the case in which a separate process for heating the adhesive layer 8 is provided. The heating temperature of the electrolytic solution 34 is, for example, about 40 degrees Celsius.

Fourth Embodiment

The present embodiment shares a common structure with the first embodiment, except for the adhesive strength reduction process. Hereinafter, an explanation will be given mainly on structures different from those of the first embodiment, and the common structure will be briefly described or omitted.

The adhesive layer 8 according to the present embodiment exhibits solubility in a predetermined solvent. In the present embodiment, the solvent dissolves the adhesive layer 8 so as to decrease the adhesive strength between the electrode plate 4 and the separator 2. For example, the solvent is mixed with the electrolytic solution 34. In this case, the adhesive layer 8 can be dissolved at the same time as the electrolytic solution 34 is injected into the case 32. The same effects as those obtained in the first embodiment can also be achieved by the present embodiment.

Fifth Embodiment

The present embodiment shares a common structure with the first embodiment, except for the adhesive strength reduction process. Hereinafter, an explanation will be given mainly on structures different from those of the first embodiment, and the common structure will be briefly described or omitted.

In the present embodiment, the stacked electrode body 1 accommodated in the case 32 is blown with gas so as to reduce the adhesive strength between the electrode plate 4 and separator 2 by wind pressure. In this case, for example, after accommodating the stacked electrode body 1 in the case 32 and before injecting the electrolytic solution 34, gas is blown onto the stacked electrode body 1 through the opening of the case 32. Air is shown as an example of the gas that is blown onto the stacked electrode body 1. Preferably, the gas is dry air. A known blower can be used for blowing the gas. The gas is blown until, for example, the internal pressure of the case 32 rises to 500 kPa. The same effects as those obtained in the first embodiment can also be achieved by the present embodiment.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the above constituting elements are also valid as embodiments of the present disclosure. Hatching applied to a cross section of a drawing does not limit the material of an object to which the hatching is applied.

Figure 6:
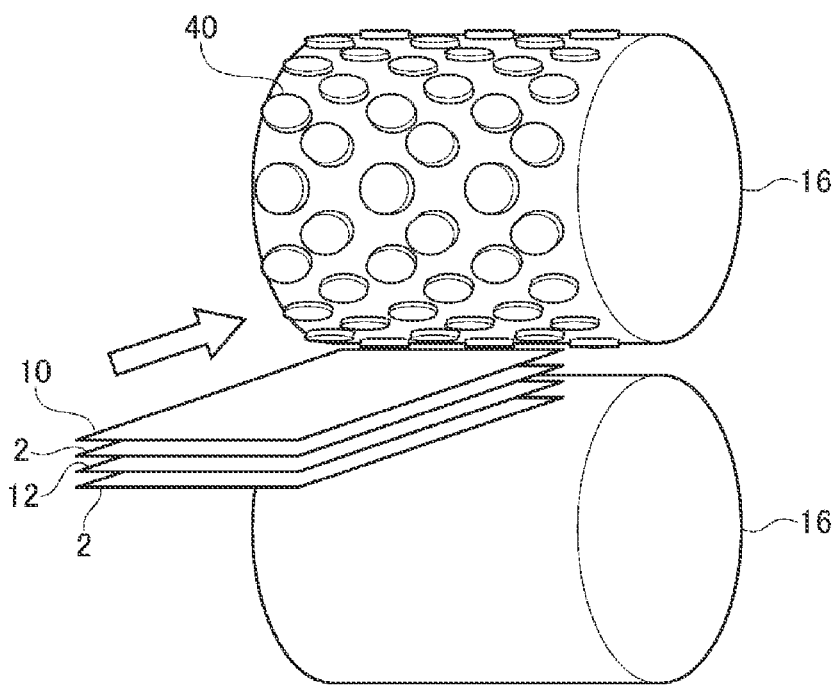
FIG. 6 is a schematic diagram of thermo-compression rollers used in the method for manufacturing a battery according to an exemplary variation.

The following exemplary variations can be listed for the first to fourth embodiments. FIG. 6 is a schematic diagram of thermo-compression rollers 16 used in the method for manufacturing a battery 36 according to an exemplary variation. The present exemplary variation includes bonding a part of the electrode plate 4 to the separator 2. For example, as shown in FIG. 6, a thermo-compression roller 16 has a plurality of convex portions 40 on the surface thereof. By applying pressure to the electrode plate 4 and the separator 2 using such a thermo-compression roller 16, only a part of the electrode plate 4 is pressed onto the separator 2, and only the pressed part can be bonded to the separator 2. By partially bonding the electrode plate 4 to the separator 2, a gap G can be more securely formed between the electrode plate 4 and the separator 2, and the impregnation time with the electrolytic solution 34 can be further shortened. By providing an adhesive layer 8 on a part of the separator 2 in an area overlapping the electrode plate 4 and pressing the entire electrode plate 4 onto the separator 2, the electrode plate 4 can also be partially bonded to the separator 2.

The adhesive strength reduction process by the heating of the adhesive layer 8, the adhesive strength reduction process by dissolving the adhesive layer 8 with a solvent, and the adhesive strength reduction process by blowing gas can be combined as appropriate.

The invention claimed is:

1. A method for manufacturing a battery, comprising:
accommodating a stacked electrode body, in which a separator that has an adhesive layer and an electrode plate are stacked and the electrode plate is bonded to the separator via the adhesive layer, in a case;
injecting an electrolytic solution into the case; and
reducing an adhesive strength between the electrode plate and the separator before, during, or after the injection of the electrolytic solution; and
wherein the stacked electrode body accommodated in the case is blown with gas so as to reduce the adhesive strength by wind pressure.

2. The method for manufacturing a battery according to claim 1, comprising:
bonding a part of the electrode plate to the separator.

* * * * *